J. G. PANNEBAKER.
AUTOMOBILE INDICATOR.
APPLICATION FILED FEB. 8, 1916.
1,217,052.
Patented Feb. 20, 1917.
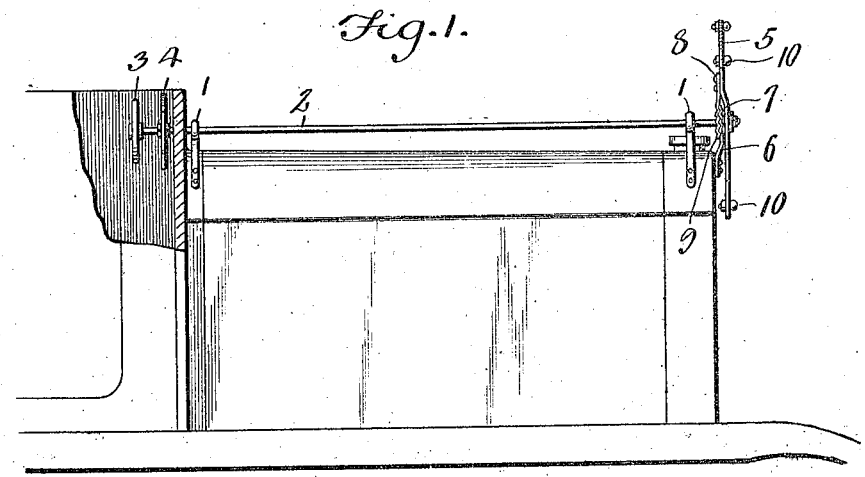
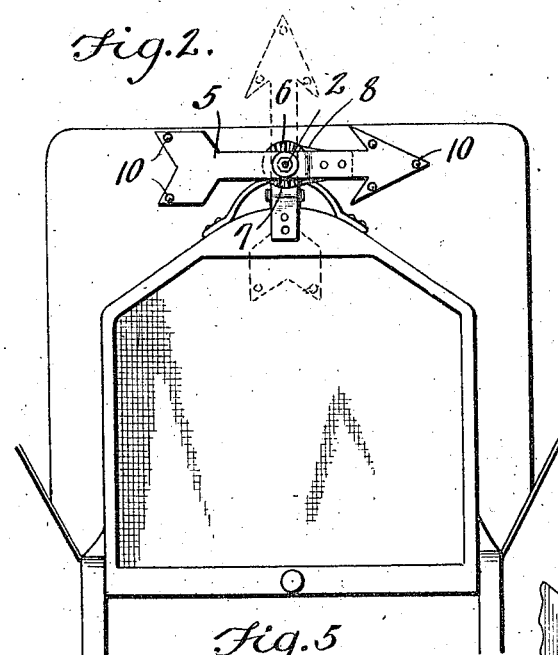
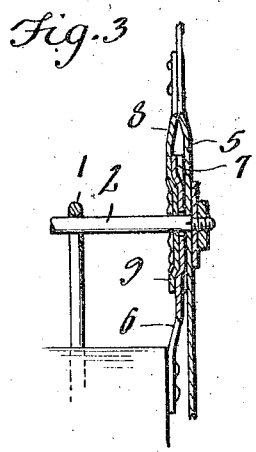
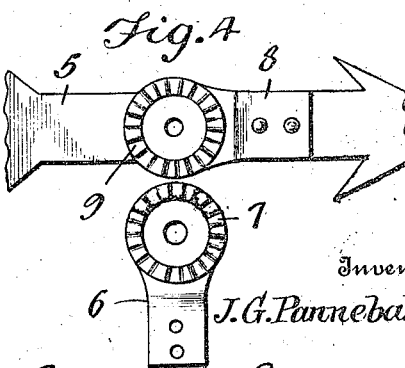
Witnesses
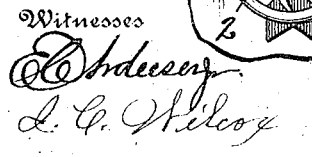
Inventor
J. G. Pannebaker
By Victor J. Evans
Attorney

UNITED STATES PATENT OFFICE.

JOHN G. PANNEBAKER, OF PENBROOK, PENNSYLVANIA.

AUTOMOBILE-INDICATOR.

1,217,052.  Specification of Letters Patent.  Patented Feb. 20, 1917.

Application filed February 8, 1916. Serial No. 77,055.

*To all whom it may concern:*

Be it known that I, JOHN G. PANNEBAKER, a citizen of the United States, residing at Penbrook, in the county of Dauphin and State of Pennsylvania, have invented new and useful Improvements in Automobile-Indicators, of which the following is a specification.

This invention relates to automobile indicators and it consists in the novel features hereinafter described and claimed.

An object of the invention is to provide an indicator of the character stated which is of simple and durable structure and which may be easily and conveniently operated by the driver of an automobile for indicating the direction in which he is about to turn the machine.

While the device is especially adapted to be used upon automobiles it may be also used to advantage on other motor vehicles as for instance, trucks, motor cycles and the like.

In the accompanying drawing:—

Figure 1 is a side view of part of an automobile showing the indicator applied.

Fig. 2 is a front view of the same.

Fig. 3 is a fragmentary sectional view of the indicator.

Fig. 4 is a side view of parts of the indicator.

Fig. 5 is a rear view of the indicator.

The indicator comprises bearings 1 which are adapted to be applied to the body of an automobile or similar machine and a shaft 2 which is journaled for rotation in the said bearings. The shaft 2 is provided at its rear end with a hand wheel 3 which is located in convenient reach of the operator of the machine. A relatively small arrow 4 is mounted upon the shaft 2 in the vicinity of the hand wheel 3 and hence, may be readily observed by the operator of the machine. A relatively large arrow 5 is also mounted upon the shaft 2 and its pointed end is disposed in the same general direction as the pointed end of the small arrow 4. The arrow 5 is located at or in the vicinity of the forward end of the shaft 2. A plate 6 is mounted upon the body of the machine to which the device is applied and the forward portion of the shaft 2 passes through the said plate 6. The plate 6 is provided with a series of corrugations 7 which are radially disposed with relation to the axis of the shaft 2. The forward side of the plate 6 is in close contact with the rear side of the large arrow 5. A resilient plate 8 is attached to the rear side of the large arrow 5 and one end portion of the plate 8 bears against the rear side of the plate 6. The plate 8 is provided with a series of radially disposed corrugations 9 which frictionally engage the corrugations 7 upon the plate 6. The large arrow 5 is provided with electric lamp bulbs 10 which may be electrically illuminated in any suitable manner for clearly displaying the arrow 5 after dark.

By reason of the fact that the plate 8 is resilient and bears against the opposite side of the plate 6 from that side against which the large arrow 5 bears, there is sufficient frictional contact established between the corrugations 7 and 9 to hold the shaft 2 at the position to which it is turned.

In operation the indicator is used as follows:—Assuming that the operator of a machine intends to turn to the right he grasps the hand wheel 3 and turns the shaft 2 so that the pointed end of the arrow 5 is disposed toward the right. If he intends to turn to the left the shaft 2 is turned so that the pointed end of the arrow 5 is disposed toward the left. If he intends to continue in a straightforward direction the pointed end of the arrow 5 is permitted to remain disposed in an upward direction. During the manipulation of the shaft it is not necessary for the operator of the machine to observe the large arrow 5 as his eyes may remain upon the small arrow 4 and he can readily see from the position of the small arrow the position to which the large arrow is turned. After the shaft 2 has been turned to place the arrows at desired positions the said corrugations frictionally engage each other and hold the arrows disposed in the desired directions.

From the foregoing description taken in conjunction with the accompanying drawing, it will be seen that an indicating device of simple and durable structure is provided and the same be easily and conveniently used for signaling or announcing the direction in which the operator of a machine is about to turn.

Having described the invention what is claimed is:—

An indicator comprising a bearing, a plate fixed with relation to the bearing and having radially disposed corrugations, a shaft journaled in the bearing and plate, an arrow mounted upon the shaft and bearing against said plate, a second plate fixed to the arrow and having a series of radially disposed corrugations which engage the first mentioned corrugations at the opposite side of the first mentioned plate from that side at which the said arrow is located.

In testimony whereof I affix my signature in presence of two witnesses.

JOHN G. PANNEBAKER.

Witnesses:
WILLIAM L. BEAM,
EDWARD ASKINS.